US009854931B2

(12) United States Patent
Rocklinger et al.

(10) Patent No.: US 9,854,931 B2
(45) Date of Patent: Jan. 2, 2018

(54) STEAM COOKING APPARATUS

(71) Applicants: Marc Rocklinger, Rancho Palos Verdes, CA (US); Nathalie de Ceglie, Rancho Palos Verdes, CA (US)

(72) Inventors: Marc Rocklinger, Rancho Palos Verdes, CA (US); Nathalie de Ceglie, Rancho Palos Verdes, CA (US)

( * ) Notice: Subject to any disclaimer, the term of this patent is extended or adjusted under 35 U.S.C. 154(b) by 0 days.

(21) Appl. No.: 14/610,544

(22) Filed: Jan. 30, 2015

(65) Prior Publication Data

US 2016/0220058 A1    Aug. 4, 2016

(51) Int. Cl.
  *A01J 11/04*    (2006.01)
  *A47J 27/04*    (2006.01)
  *A23L 5/10*    (2016.01)

(52) U.S. Cl.
  CPC ............... *A47J 27/04* (2013.01); *A23L 5/13* (2016.08); *A47J 2027/043* (2013.01)

(58) Field of Classification Search
  CPC ... A47J 27/04; A47J 2027/043; A23L 1/0121; A21B 3/04; A23V 2002/00
  USPC .................................... 99/330, 467; 219/401
  See application file for complete search history.

(56) References Cited

U.S. PATENT DOCUMENTS

| 4,452,132 A | 6/1984 | Miller et al. |
| 4,906,485 A | 3/1990 | Kirchhoff |
| 7,274,003 B2 | 9/2007 | Baumann |
| 7,549,369 B2 | 6/2009 | Zimmerman |
| 8,191,465 B2 | 6/2012 | Sager et al. |
| 2010/0151092 A1 | 6/2010 | Sus et al. |
| 2011/0168690 A1 | 7/2011 | Tomomura et al. |
| 2011/0256287 A1 | 10/2011 | Sus et al. |
| 2013/0019856 A1 | 1/2013 | Buehler |
| 2013/0264333 A1 | 10/2013 | Alipour et al. |
| 2014/0199454 A1* | 7/2014 | Storek ............... A47J 36/32 426/508 |

FOREIGN PATENT DOCUMENTS

| JP | 2003070644 A | 3/2003 |
| JP | 2005067716 A | 3/2005 |

OTHER PUBLICATIONS

International Written Opinion for related PCT/US2016?015808 filed at USRO filed Jan. 29, 2016.

* cited by examiner

*Primary Examiner* — Thien S Tran
(74) *Attorney, Agent, or Firm* — Fulwider Patton LLP (57) ABSTRACT

A food container is covered by a foil to enclose food to be steam cooked. A holding chamber has a lid configured to be opened so that the food container can be placed within the chamber. When the lid is closed, the food container is enclosed within the holding chamber. A plurality of first nozzles extending from the lid into the holding chamber wherein when the lid is closed, the plurality of nozzles penetrate through the foil of the food container. A shower of superheated steam is introduced into the food container through the nozzles to cook the food. Steam is pulled from the food container through a centrally located exhaust port in the lid, and is reheated and recirculated back into the food container through the nozzles.

20 Claims, 12 Drawing Sheets

STEAM COOKING APPARATUS

BACKGROUND

Steam can be used for cooking vegetable and meat selections. While traditional ovens cook using hot air generated by heating elements in the oven walls, a steam oven cooks using steam generated within a cooking chamber. Archaeological excavations have uncovered pottery cooking vessels known as Yan steamers. A modern conventional steam oven can be equipped with a reservoir that is filled with water, and heating the water to boil generates steam. The generated steam may be introduced into the cooking chamber to cook food placed into the chamber.

Steam-cooked foods can retain more of their flavor, texture and color. Conventional dry heat cooking tends to rely on added fat to keep food from drying out. Food cooked with steam generally does not dry out, so supplementary fat is not required. Also, fewer vitamins, minerals and nutrients may be lost with steam cooking rather than with dry-heat cooking.

Dry or superheated steam has been applied to a wide range of fields including food preparation. Superheated steam is generated by heating ordinary steam from 100° C. to a higher temperature.

SUMMARY OF THE INVENTION

This invention relates to apparatus and methods for cooking or heating food in a container using steam including superheated steam.

In one embodiment, a steam cooking apparatus comprises a holder chamber; a food container having a bottom and a top, wherein the top is covered by a foil to enclose food to be steam cooked within the food container, the food container sized to fit within the holder chamber; a lid configured to engage the top of the food container within the holder chamber; a plurality of first nozzles extending from the lid into the holder chamber wherein when the lid is engages the food container in the holder chamber, the plurality of first nozzles penetrate through the foil of the food container; a steam source; and the plurality of first nozzles being in fluid communication with the steam source such that steam is introduced into the food container through the plurality of first nozzles.

Another embodiment of a steam cooking apparatus further comprises a second holder chamber; a second container covered by a second foil to enclose flavoring within the second container, the second container sized to fit within the second holder chamber; a second lid configured to engage the top of the second container within the second holder chamber; and a plurality of second nozzles extending from the second lid into the second holder chamber wherein when the second lid is closed, the plurality of second nozzles penetrate through the second foil of the second container; wherein at least one of the plurality of second nozzles being in fluid communication with the reheated steam such that reheated steam is introduced into the second container through the at least one second nozzle, and the reheated steam exits the second container through the remaining second nozzles, wherein the remaining second nozzles are in fluid communication with the plurality of first nozzles.

In another embodiment, the first lid and the second lid are coupled together such that when the first lid opens, the second lid opens, and when the first lid closes and the plurality of first nozzles penetrate through the foil of the food container, the second lid closes the plurality of second nozzles penetrate through the second foil of the second container.

In another embodiment, a food container has a top covered by a foil to enclose food to be steam cooked within the food container; and a perforated floor within the food container wherein the perforated floor separates an upper portion of the food container from a lower portion of the food container, and the food occupies the upper portion of the food container adjacent the foil.

In another embodiment, an RFID tag is located in the bottom of the food container wherein the RFID tag contains cooking information regarding the food in the food container.

An embodiment of a method of steam cooking comprising the steps of inserting a food container into a holder chamber, wherein the food container is covered by a foil to enclose food to be steam cooked within the food container; closing the holder chamber with a lid having a plurality of first nozzles in fluid connection with a steam source, wherein the plurality of first nozzles penetrate through the foil of the food container when the holder chamber is closed by the lid; and introducing steam through the plurality of first nozzles into the food container to produce a steam shower for cooking the food within the food container.

Another embodiment of a method of steam cooking further includes the steps of inserting a second container into a second holder chamber, wherein the container is covered by a foil to enclose a flavoring compound within the second container; closing the second holder chamber with a second lid having a plurality of second nozzles, wherein the plurality of second nozzles penetrate through the second foil of the second container when the second lid is closed upon the second holder chamber; and applying steam through at least one of the second nozzles into the second container and the steam exits the second container through the remaining second nozzles wherein the remaining second nozzles are in fluid communication with the plurality of first nozzles to provide flavoring steam through the plurality of first nozzles into the food container.

DETAILED DESCRIPTION OF THE PREFERRED EMBODIMENTS

In a preferred embodiment, a steam cooker delivers superheated steam into a food container via a plurality of nozzles to create a steam shower to cook food within the container. For convenience, in a food container covered by a foil, food is cooked by a steam shower from nozzles that penetrate through the foil. Referring now to the drawings, like parts are designated by like reference numbers or characters.

Figure 1:
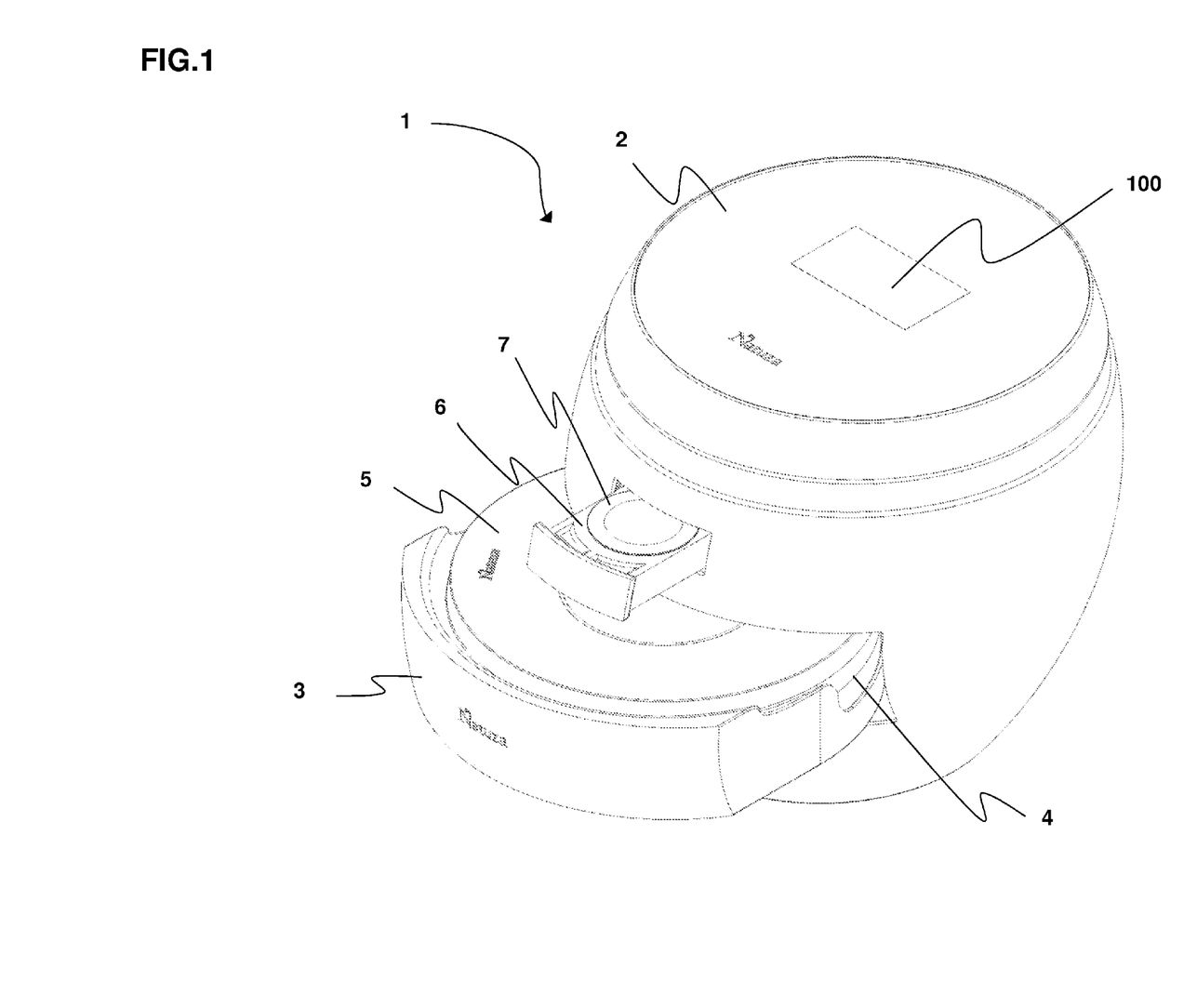
FIG. 1 is a perspective view showing the outer appearance of a steam cooking apparatus with a food plate container and flavor pod container.

FIG. 1 shows an embodiment of a steam cooker 1 with a barrel-shaped housing 2 configured to accept a food plate container 5 and a flavor pod container 7. The cooker 1 has a food container holder 4 that may be part of plate drawer 3 that is opened by an ejection mechanism. The food plate holder 4 in FIG. 1 is shown in an ejected position. Thermal insulation for the holder may achieved by using a surrounding vacuum or by using insulation material. The food container holder 4 is configured to accept the food plate container 5. The holder 4 may be configured to accept food plate containers of different volumes. The extended brim of the food plate container 5 may support the food container 5 in the holder 4 so that the holder 4 may accept food containers of different volumes.

The cooker 1 also may have a pod holder 6 configured to accept the flavor pod container 7. The flavor pod holder 6 is shown in an ejected position.

The housing 2 also may have a touch screen display 100 to control the operation of the cooker 1. Similar to the operation of a CD player, both the plate drawer 3 and the pod holder 6 can be motor-motion-controlled or be manually pushed by hand inside the apparatus.

Figure 11:
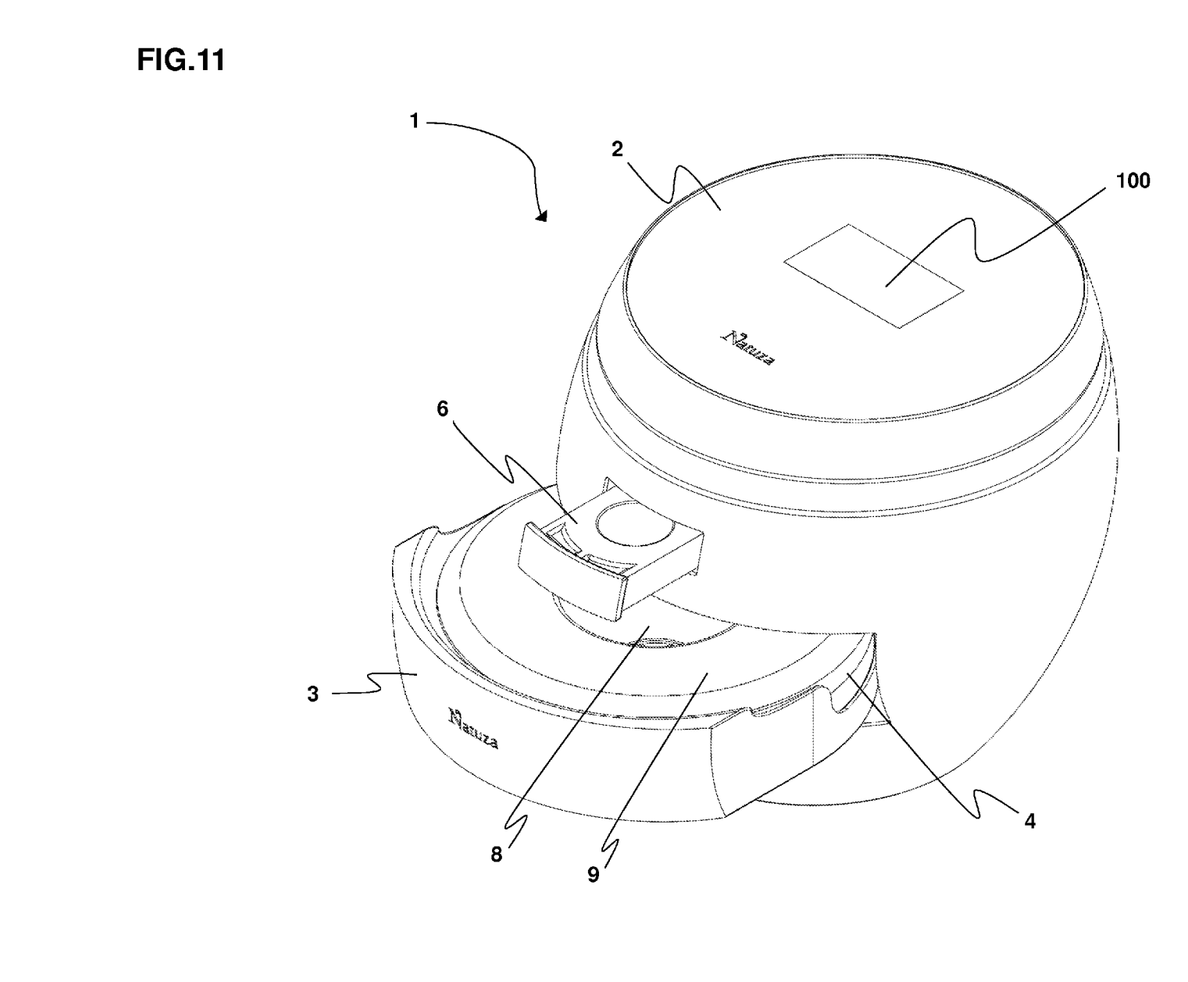
FIG. 11 is a perspective view of the steam cooking apparatus of FIG. 1 without a food plate container and flavor pod container.

As will be discussed later, FIG. 11 shows the steam cooker 1 of FIG. 1 without a food plate container or a flavor pod container. The food container holder 4 of the plate drawer 3 is in the open or ejected position. The flavor pod holder 6 also is shown in an ejected position.

Figure 2:
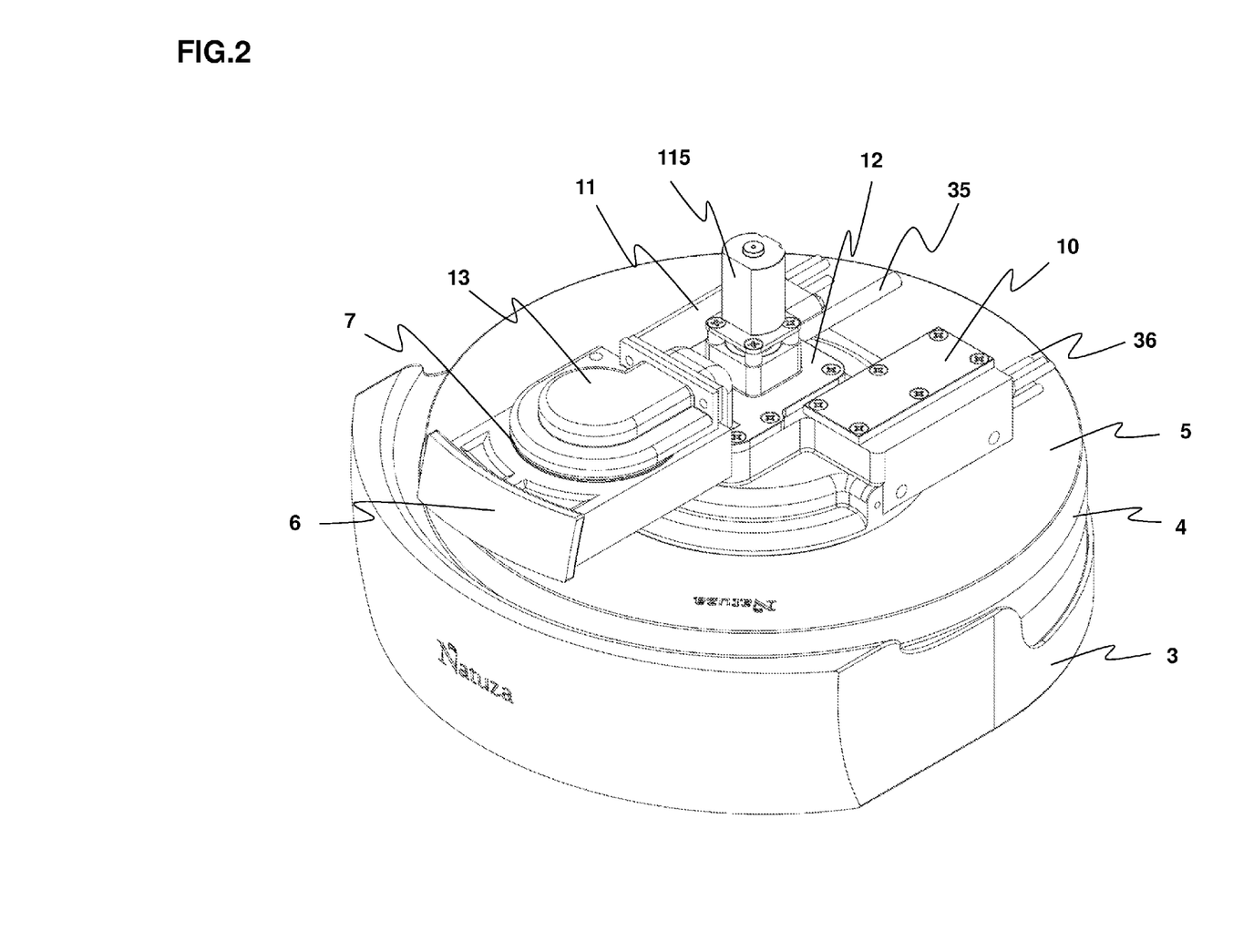
FIG. 2 is a perspective view of the steam cooking apparatus with the upper housing removed to show the interior of the apparatus of FIG. 1.

FIG. 2 is a perspective view of the steam cooker 1 with the upper portion of the housing removed to show the interior of the apparatus. The plate drawer 3 and the food container holder 4 with the food plate container 5 is in what ordinarily would be closed or unejected position. The pod holder 6 with the flavor pod container 7 also is in what ordinarily would be closed or unejected position.

Water enters the system through supply pipe 36 and exits through exhaust pipe 35. Steam is generated within the boiler 10. Steam is introduced into the food plate container 5 by the steam shower plate 11. Steam is evacuated from the food plate container 5 by the steam blower 12 powered by the motor fan 115. Steam can recirculated and channeled to the pod steam shower 13 for the flavor pod container, and to the steam shower plate 11 for the food plate container 5. Steam returned from the pod steam shower 13 also can be channeled to the steam shower plate 11. Spent steam can be channeled through an exhaust pipe 35.

Figure 3:
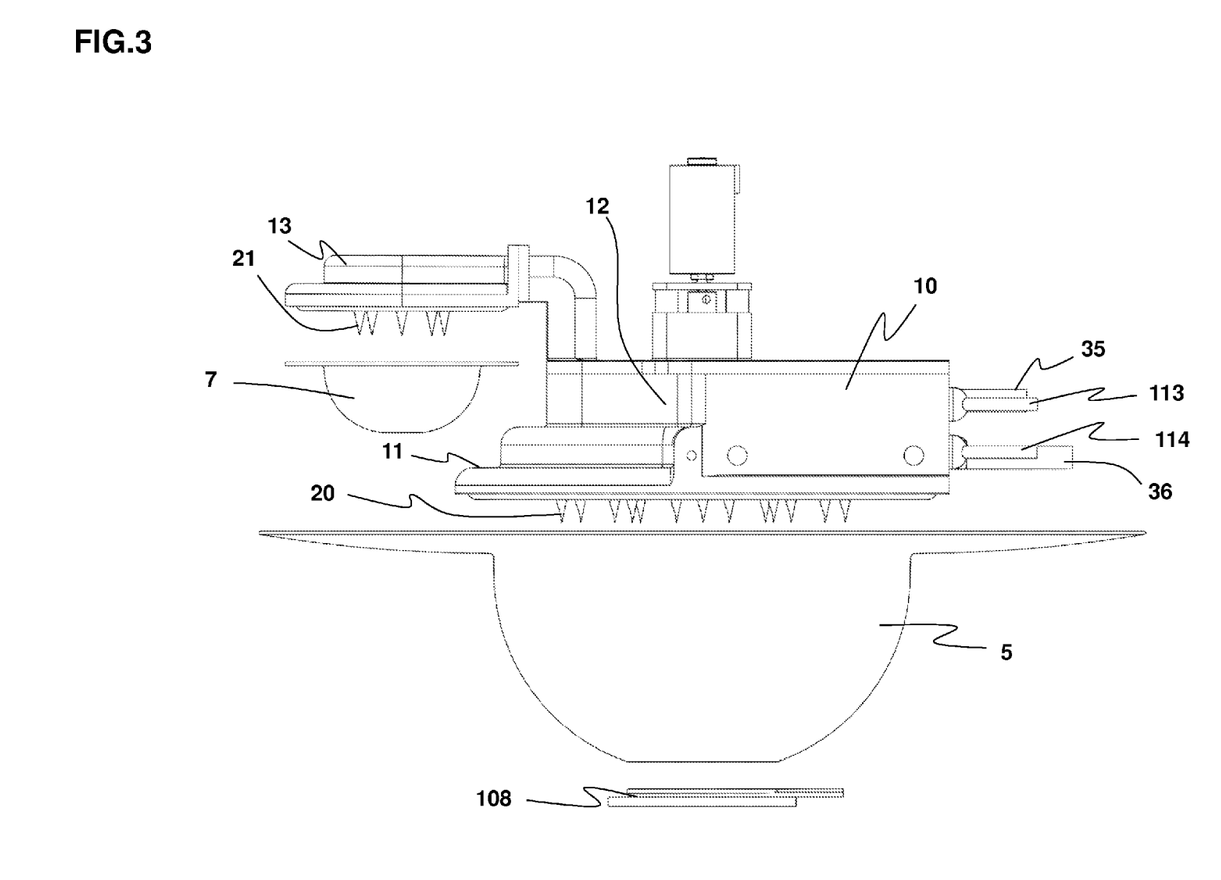
FIG. 3 is a side elevation view of a portion of the apparatus of FIG. 2.

FIG. 3 is a side elevation view of a portion of the apparatus of FIG. 2 without the plate drawer, the food container holder, and the flavor pod holder. A water supply pipe 36 delivers water that is used to generate the steam. The boiler 10 may generate steam by flash evaporation or throttling from high to low pressure, instead of conventional boiling by heating a reservoir of water. The heating elements 113 of the boiler 10 heats the water to the boiling point, and a superheating element 114 is used to superheat the steam. The heating element 113 may include a heat exchanger, and superheating element 114 further heats the steam from the boiler to generate superheated steam. The operation of heating element 113 and superheating element 114 of the heating system may be controlled based on feedback from temperature, humidity and/or pressure sensors. Thermal insulation for the heating element 113 and superheating element 114 of the heating system may be achieved by using a vacuum surrounding the heating system or by using an insulation material.

Dry or superheated steam is at a temperature higher than water's vaporization (boiling) point. Superheated steam has a temperature state of above 100° C. by boiling water and overheating it further to the vapor state. Superheated steam may be produced by taking steam at 212 degrees Fahrenheit (100° C.) which is then further heated to a higher temperature such as 272 degrees Fahrenheit (133° C.).

Superheated steam is delivered to the steam shower plate 11 which has a plurality of nozzles 20. The pod steam shower 13 has a plurality of nozzles 21. The pod steam shower 13 is linked to the steam shower plate 11. The pod steam shower 13 mechanically moves in conjunction with the steam shower plate 11, and the pod steam shower 13 is in fluid communication with the steam shower plate 11.

Pressing the start button on the display (or starting the cycle remotely using a WiFi or Bluetooth connection with a personal digital device such as a smartphone or tablet), the steam shower plate 11 and the pod steam shower 13 performs a Z-axis motion and the nozzles 20 and 21, 24 and 25 simultaneously perforates the foil 22 covering the food plate container 5 and the foil 23 covering the flavor pod container 7, respectively. The foil may be made from aluminum.

A plurality of nozzles 20 of steam shower plate 11 delivers steam to the food plate container 5. The steam introduced by the nozzles 20 preferably has an absolute vapor pressure from 1 to 3 bars. The bottom of the food plate container 5 can have an RFID tag which may be energized by a coil 108 in the cooker housing or otherwise read by an RFID reader. The RFID may contain cooking information about the food contained in the plate container 5. One or more nozzles 21 of the pod steam shower 13 deliver steam recirculated from the steam shower for the food container 5 to the flavor pod container 7, and flavored steam is delivered from the flavor pod container through the remaining nozzles of the pod steam shower 13 to the food container through the nozzles of steam shower plate 11.

Figure 4:
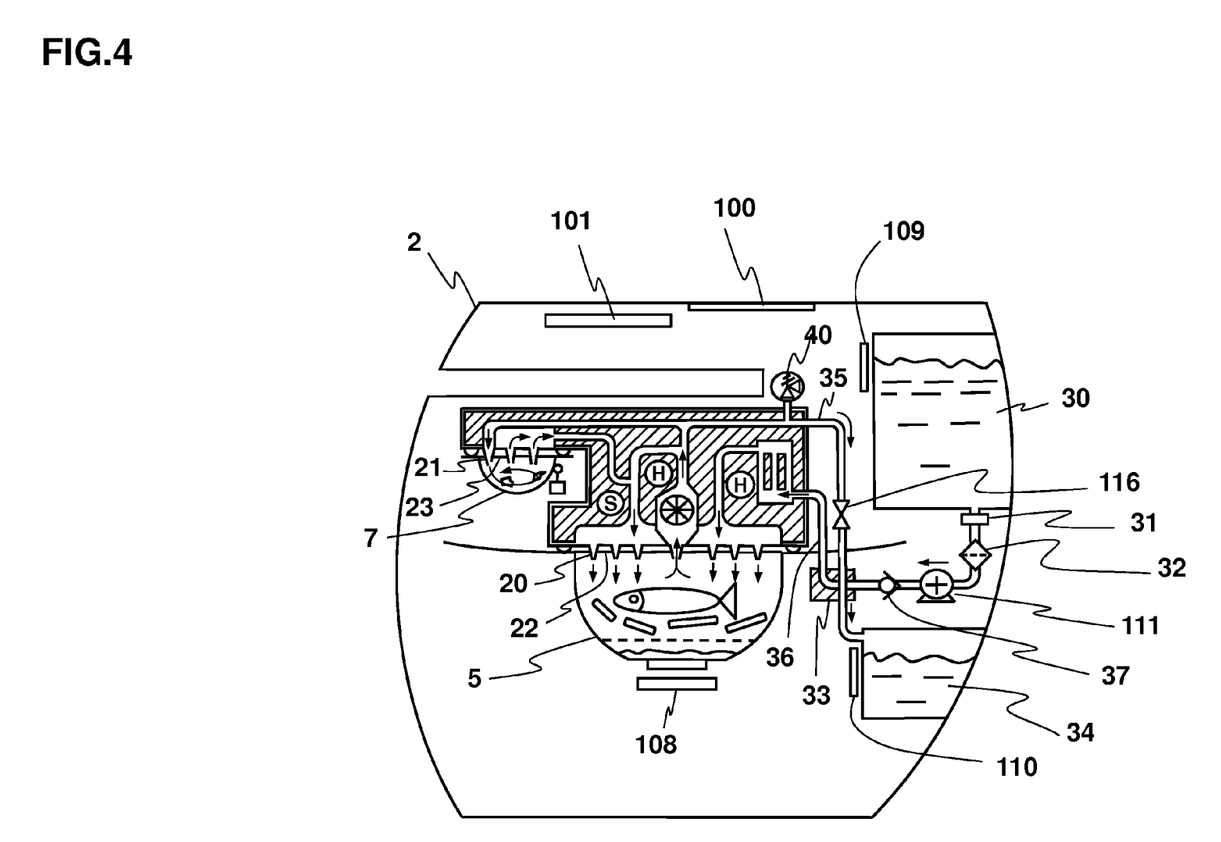
FIG. 4 is a schematic view of the steam cooking apparatus.
Figure 5:
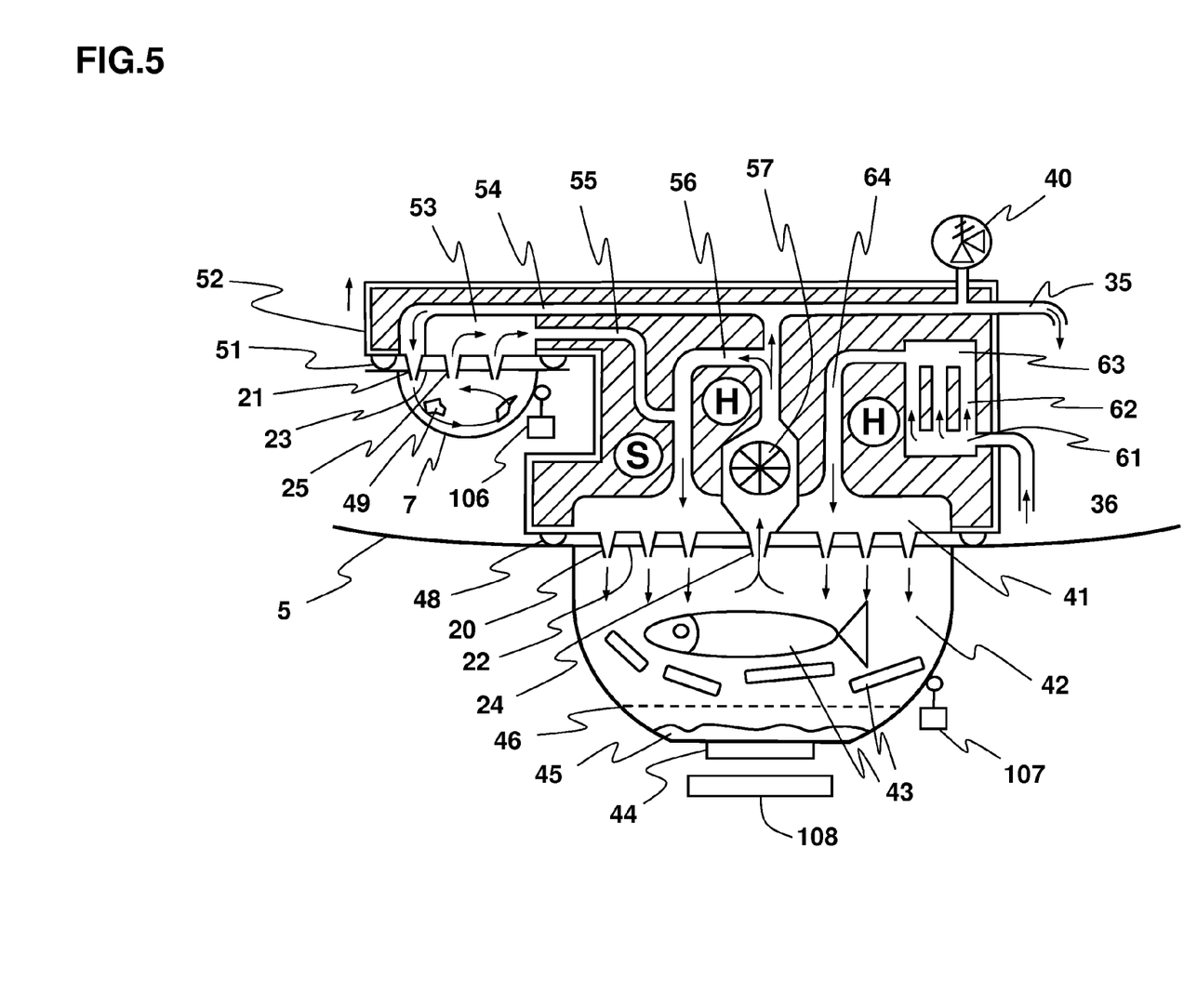
FIG. 5 is an enlarged schematic view of a portion of the apparatus of FIG. 4

FIGS. 4 and 5 are schematic views of the steam cooker. FIG. 5 is an enlarged view of a portion of FIG. 4. The position of the flavor pod container 7 and food plate container 5 can be detected by a position sensor 106 and 107 (see FIG. 5). The properties of the food contain inside the plate may be factory-recorded on a RFID tag incorporated as part of the food plate container 5. Information on the RFID tag can be used by the control unit 101 to control the cooking parameters of the apparatus. The RFID tag may be accessed using an energizing coil 108 where the content is read by a RF antenna/chip part of the control unit 101, or by another suitable RFID reader system.

As illustrated in FIG. 4, when water is added into a reservoir 30, the water level in the reservoir 30 is detected by a water level sensor 109. If the water level in the reservoir is low, the cooker may emit a warning (audio, visual, or both) to prompt a user to refill the reservoir with additional water.

When the pump 111 is activated, water flows through a filter 32, a check valve 37, and a heat exchanger 33 which is heated to warm the water before it is sent to the boiler 10. The warmed water is then delivered through pipe 36 to heating system H further heated to produce steam including dry or superheated steam. The operation of the heating and superheating elements of the heating system H may be controlled based on feedback from temperature, humidity and/or pressure sensors S. Thermal insulation for the heating and superheating elements of the heating system H may achieved by using a vacuum surrounding the heating system or by using an insulation material.

Waste or drain steam is exhausted by the control valve 116 through the pipe 35 and transferring heat inside the condenser into a waste water tank 34 whose water level is detected by a sensor 110 (and warns the user when the waste water tank is full). An overpressure or steam relief valve 40 may be employed to keep the system within safe operating parameters.

Referring in particular to the enlarged view of FIG. 5, water is heated inside the boiler chamber 61. Water is then directed through hot vaporization tubes 62. The water vaporizes inside the tube 62 and enters dry steam distribution chamber 63. The steam generator process is conducted at a constant temperature above 100° C. controlled by a temperature sensor S. Humid steam flows through pipe 64 into the dry steam distribution chamber 41 where it is heated to 120° C. or higher. The steam is superheated and flows through the nozzle 20 that has perforated the foil 22 covering the food plate container 5 into the cooking chamber 42 of the food plate container 5 where the food 43 to be cooked may consist of a meat selection, a vegetable selection, a fruit selection, a grain selection, or a combination. The meat selection may include fish, poultry or rabbit. The selection of food also may include pasta, crustaceans, egg, scallops, and other foods.

As energy of the dry steam is transferred to cook the food, the steam becomes humid and may condensed and flow on the side of the plate through the perforated floor 46 within the container 5 so that the water may collect along the bottom interior of the container away from the food being cooked within the container above the perforated floor. A moisture-absorbent material 45 may be placed under the perforated floor 46 to absorb the water that has condensed and collected along the bottom interior of the container 5.

Figure 6:
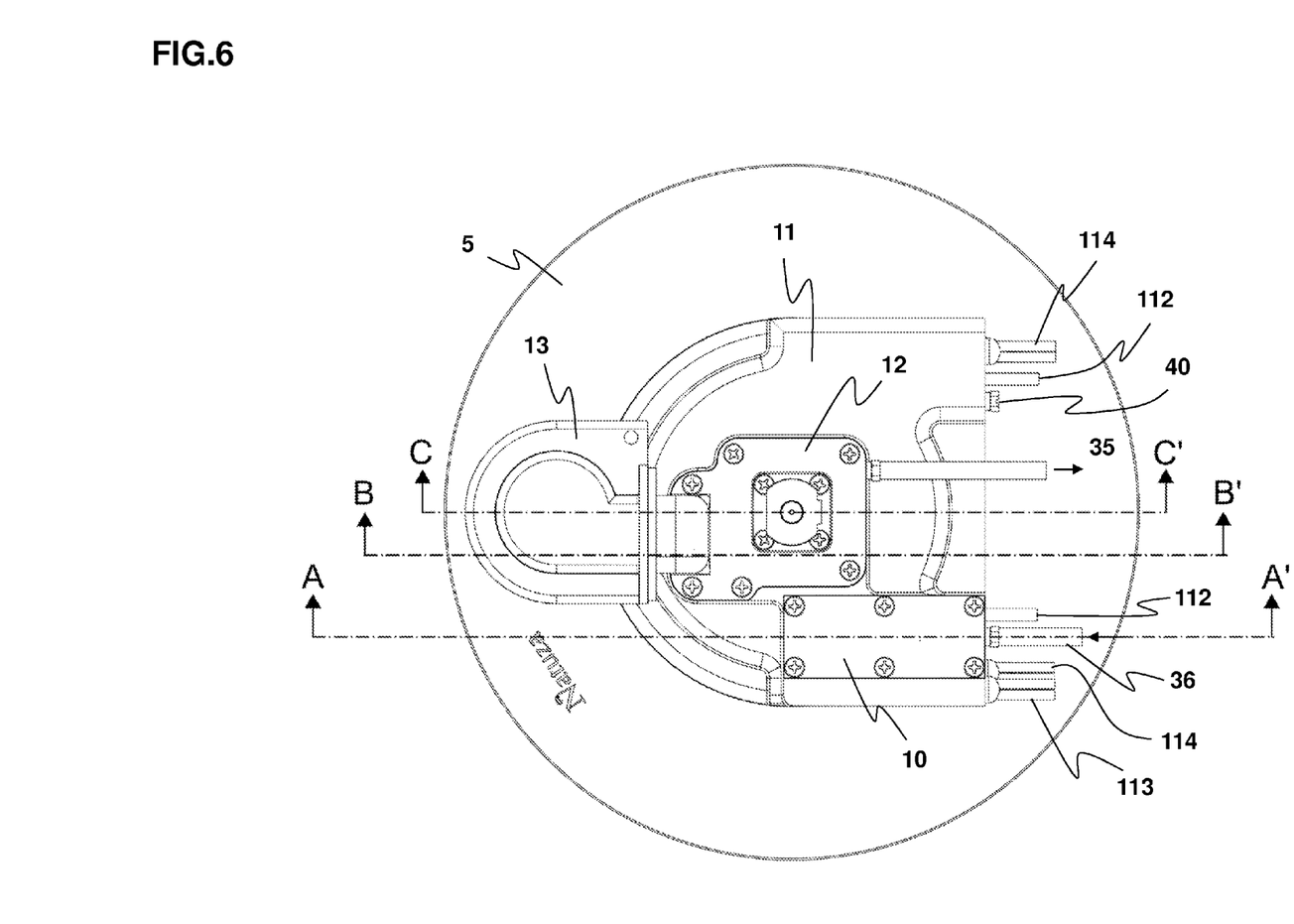
FIG. 6 is a top elevation view of the apparatus of FIG. 3.

FIG. 6 shows a top view of the internal mechanisms of the steam cooker showing the water supply pipe 36 to the boiler 10, the exhaust drain pipe, the pod steam shower 13 for the flavor pod container, and the steam shower plate 11 for the food plate container 5. The steam blower 12 is mounted atop the steam shower plate 11. Heating and superheating elements 113 and 114, respectively, also are shown.

Figure 7:
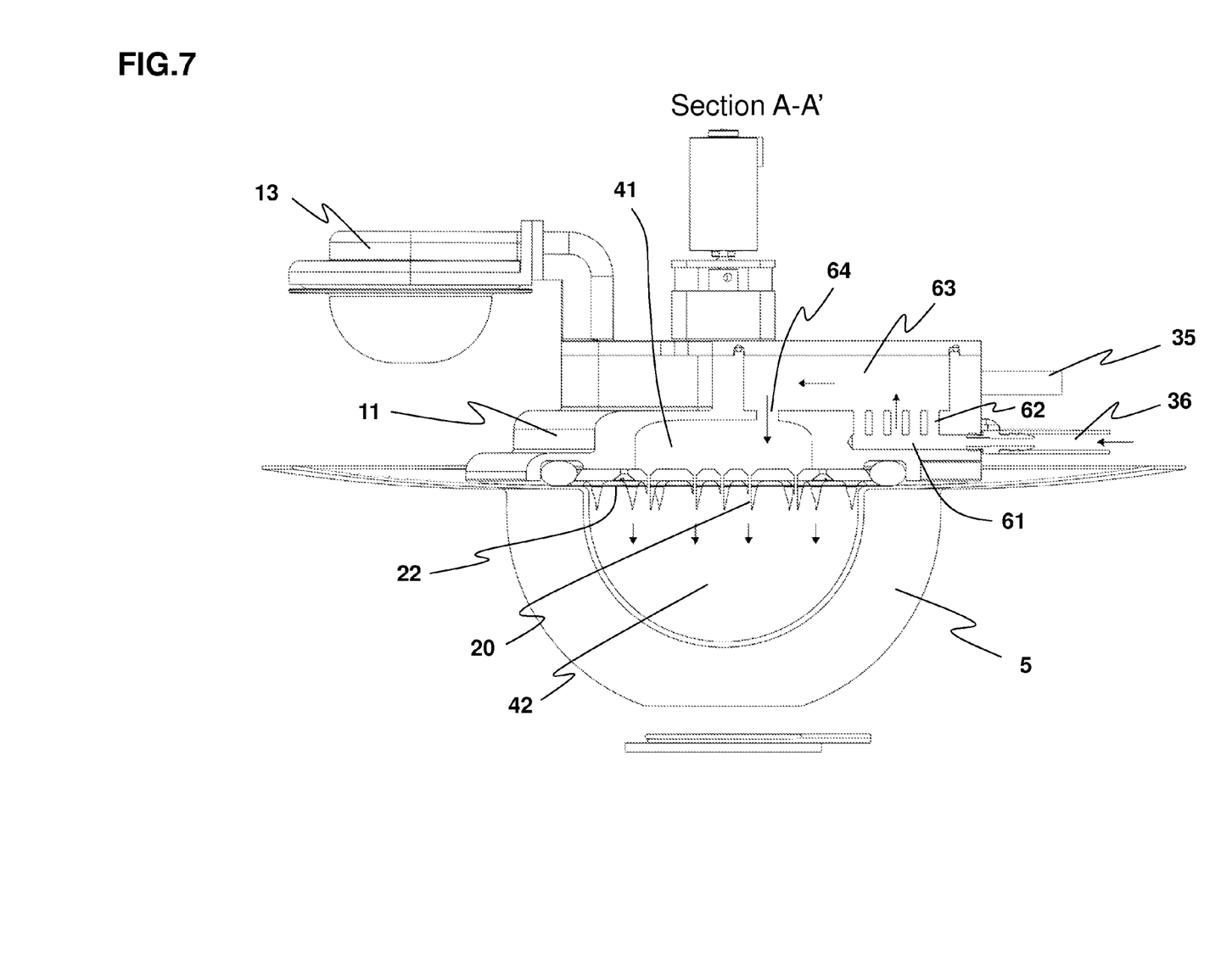
FIG. 7 is a sectional view taken along the line A-A of FIG. 6.

FIG. 7 is a cross-sectional view taken along lines A-A of FIG. 6. As previously discussed, warmed water is delivered through pipe 36 into the boiler chamber 61 where the water is then directed through hot vaporization tubes 62 which vaporizes the water. The vaporized water collects in a humid steam chamber 63 and is conveyed through a steam channel 64 to the dry steam distribution chamber 41 where the steam is superheated. The superheated steam flows into the cooking chamber 42 of the food container 5 through the delivery nozzles 20 that have perforated the foil 22 of the food plate container 5.

Figure 8:
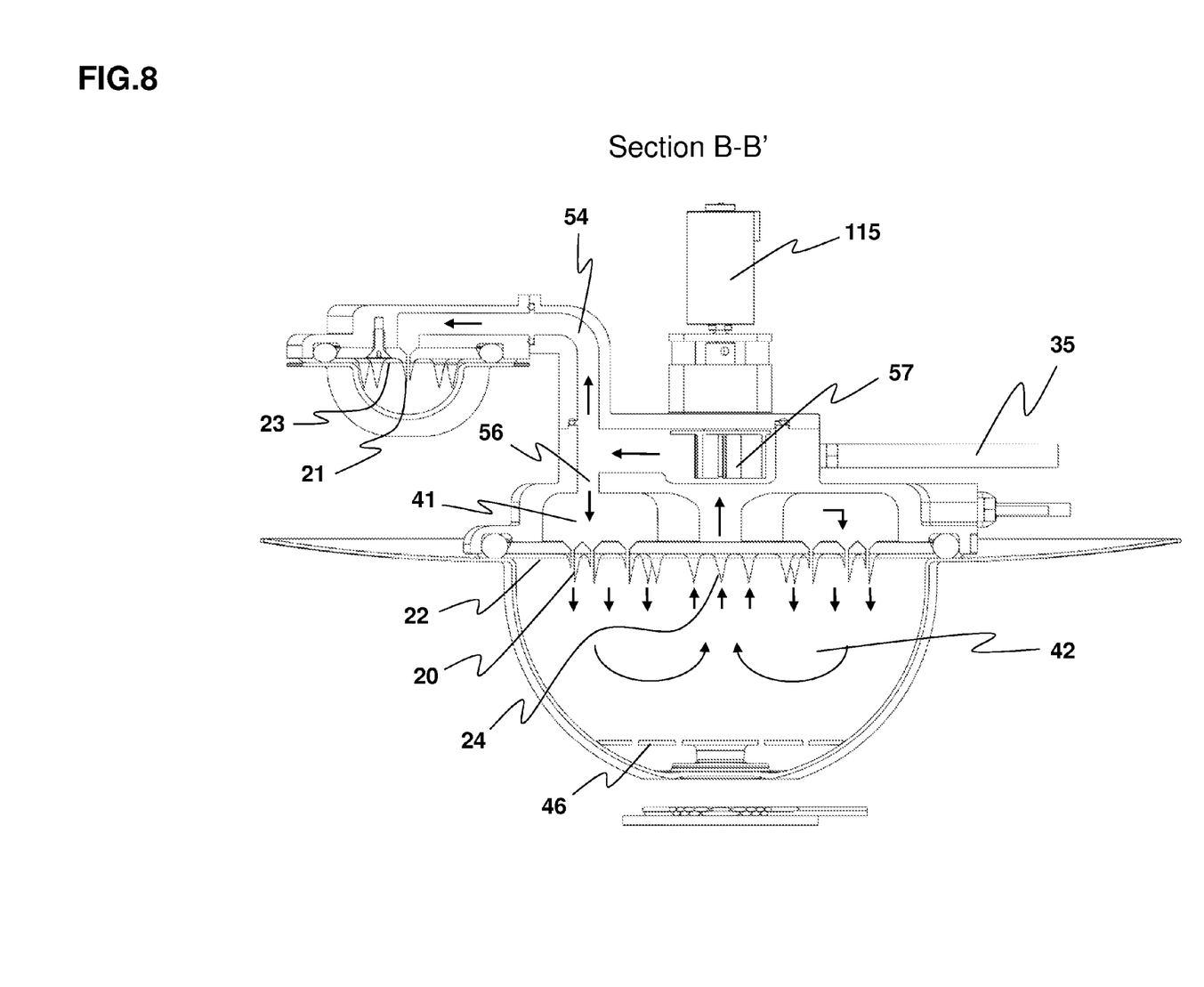
FIG. 8 is a sectional view taken along the line B-B of FIG. 6.

FIG. 8 is a cross-sectional view taken along lines B-B of FIG. 6. Near the bottom of the food plate container there is an interior perforated floor 46 upon which the food sits. As the steam circulates and cooks the food within the cooking chamber 42 of the food container, moisture and condensation that forms on the food, and on the interior walls of the food container, can pass through the perforated floor 46 and away from the food. A moisture-absorbing material can be placed under the perforated floor 46.

As the steam cooks the food and becomes spent, steam is drawn out of the food chamber 42 of the food container 5 through centrally located exhaust or return nozzles 24 by the blower 57 powered by fan motor 115. If the cooking process is completed, or if relief of pressure is needed, the appropriate valves (not shown) may be opened to allow exhausted steam to travel through pipe 35 to the waste water tank. Otherwise, as illustrated in FIG. 8, the drawn steam is directed back in part into the distribution chamber 41 through pipe 56, and the heated chamber 41 keeps the drawn steam superheated. Drawn steam also is directed in part through pipe 54 to the steam shower for the flavor pod container and delivered into the flavor pod container through the delivery nozzle 21 that has pierced the foil 23. The delivery nozzle 21 may be one or more nozzles offset from the center of the shower lid 13. Having the delivery nozzle located at the periphery creates a cyclonic or centrifugal effect within the flavor pod container when the steam is delivered into the flavor pod container, which helps mix the flavoring with the incoming steam.

Figure 9:
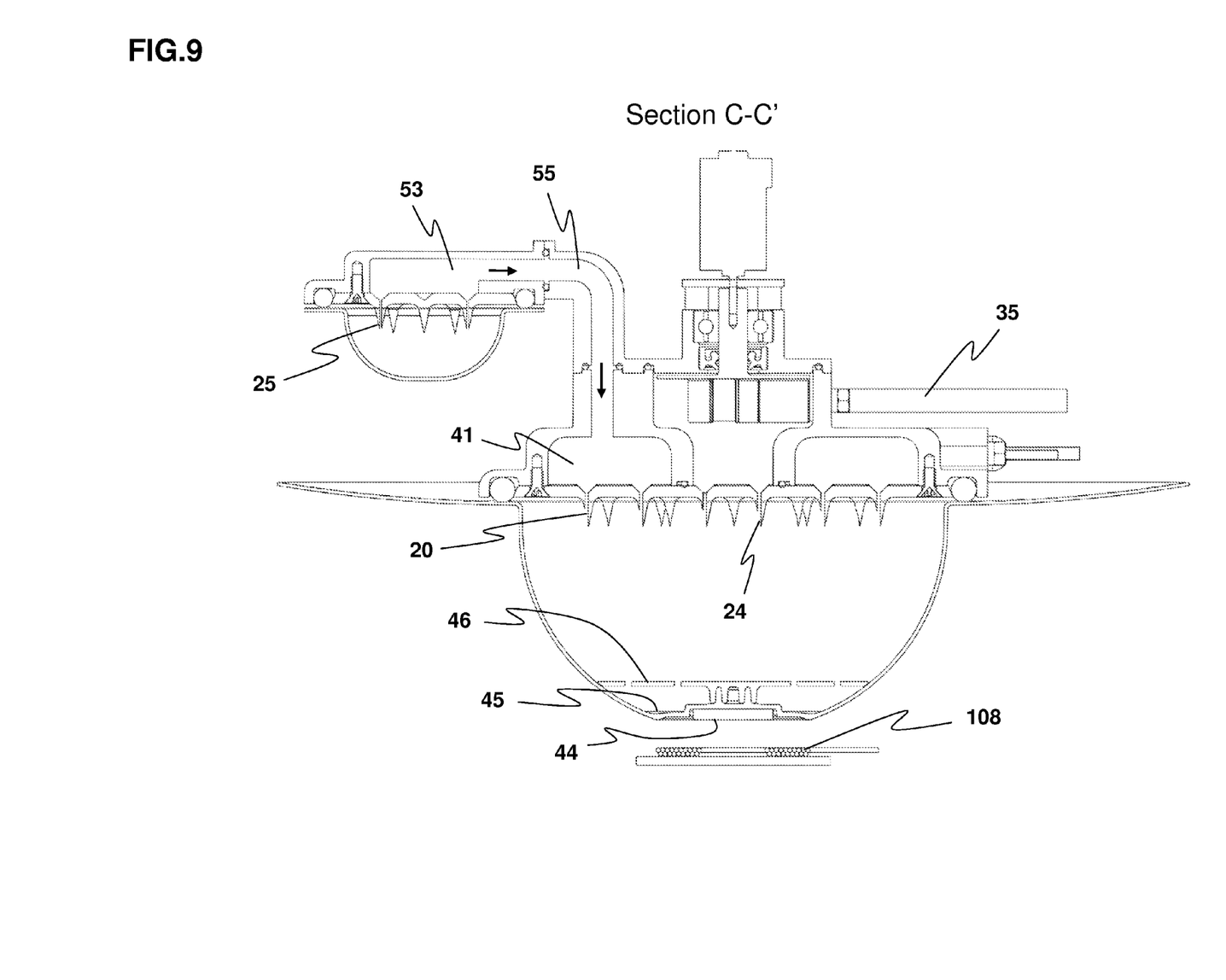
FIG. 9 is a sectional view taken along the line C-C of FIG. 6.

FIG. 9 is a cross-sectional view taken along lines C-C of FIG. 6. The flavor pod container may hold spices and herbs, whose flavor may be transferred to the steam, and this flavored steam flows out of the flavor pod container through the exhaust or return nozzles 25 in fluid communication with the chamber 53 and back through pipe 55 to the steam shower plate 41 for distribution into the food container to flavor the food being cooked within the food container.

As previously discussed, moisture absorbent material 45 may be placed under the perforated floor 46 to absorb the water that has condensed and drained through the perforated floor and collected along the interior bottom of the food container. The perforated floor 46 may be press fit to engage a projection formed from the bottom of the food container so that it is mechanically secured in place.

The properties of the food contained inside the food container, including cooking instructions, may be factory-recorded on a RFID tag 44 placed in an exterior recess formed in the bottom of the food container. The RFID tag may be accessed using an energizing coil 108 (where the content is read by an RF antenna/chip part of the control unit), or another suitable RFID reader system.

Figure 10:
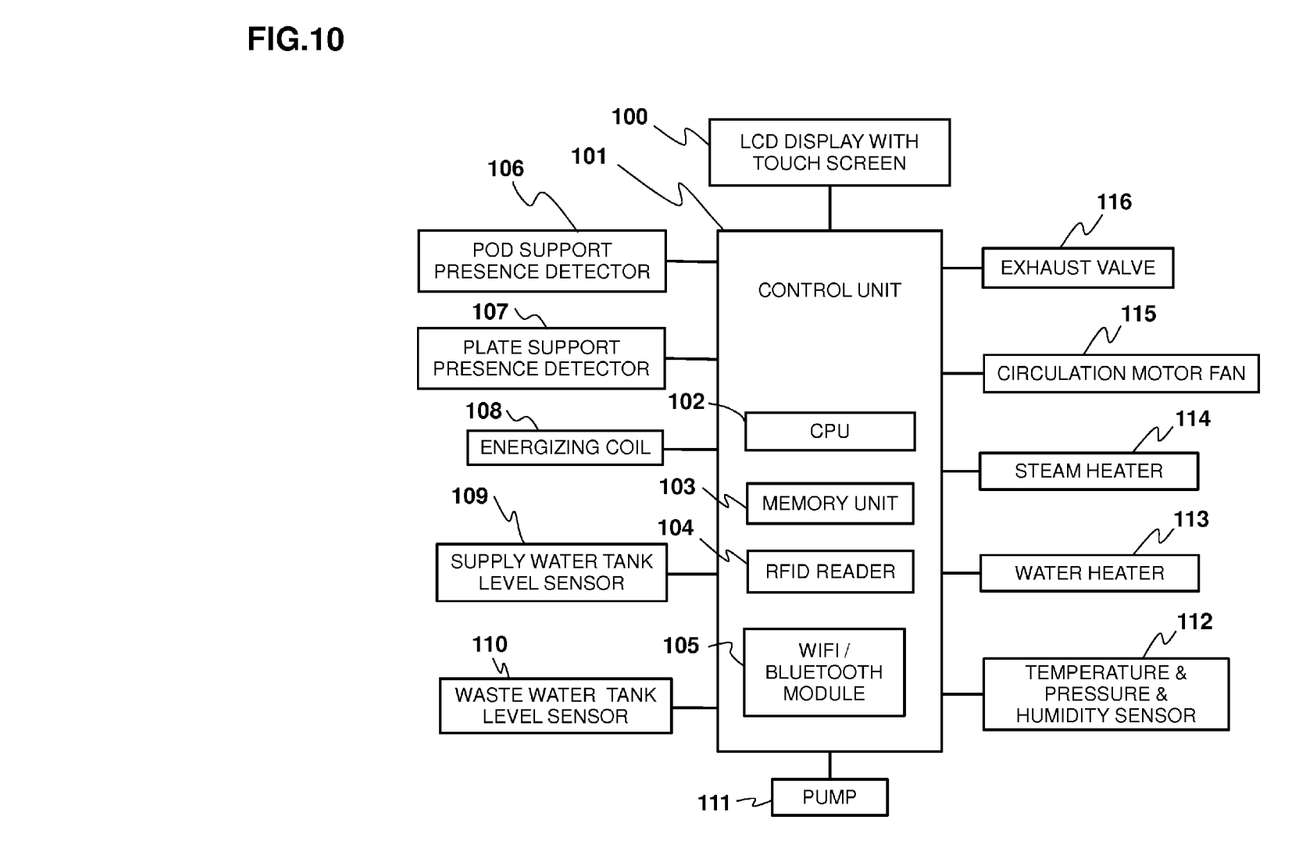
FIG. 10 is a block diagram of a control unit for a steam cooking apparatus.

FIG. 10 is a block diagram of a control unit for the steam cooking apparatus. The control unit 101 preferably consists of a CPU 102, memory unit 103, RFID reader 104, and a WiFi/Bluetooth module 105. The control unit 101 also may include a transceiver for an Internet connection. The control unit 101 receives and sends signals to devices such as the pod support presence detector 106, plate support presence detector 107, energizing coil 108, supply water tank level sensor 109, waste water tank level sensor 110, pump 111, temperature, pressure and/or humidity sensors 112, the water heater 113, the steam heater 114, circulation motor fan 115, and exhaust valve 116, to control the steam cooking process of the apparatus. The control unit 101 may issue instructions for the cooking apparatus based on feedback from these sources. The user interface for the control unit 101 preferably is a touch screen LCD display 100. The touch screen display 100 may be mounted on the housing of the steam cooking apparatus or may be part of a remote device. A user may use the touch screen display 100 to control the operation of the steam cooking of the apparatus, or to order additional containers of food for steam cooking over an Internet connection.

FIG. 11 is a perspective view of the steam cooking apparatus of FIG. 1 without a food plate container and flavor pod container. The cooker 1 has a food container holder 4 as part of plate drawer 3 that is shown in an ejected position. The food container holder 4 is configured to accept a sealed food plate container (not shown) where the food-containing portion of the container is placed within a holder chamber 8 below an extended support area 9. The chamber of the food container holder 4 can accept food plate containers of different volumes where the containers have enlarged brims for engaging the extended support area of holder 4. Thermal insulation for the holder may achieved by using a vacuum or insulation material. The cooker 1 also may have a flavor pod holder 6 configured to accept a flavor pod container (not shown). The flavor pod holder 6 is shown in an ejected position, and flavor pod holder also may be configured to have a holder chamber below an extended support area, where the holder chamber is configured to accept a flavor pod container. A touch screen display 100 may be used to control the operation of the cooker 1.

Figure 12:
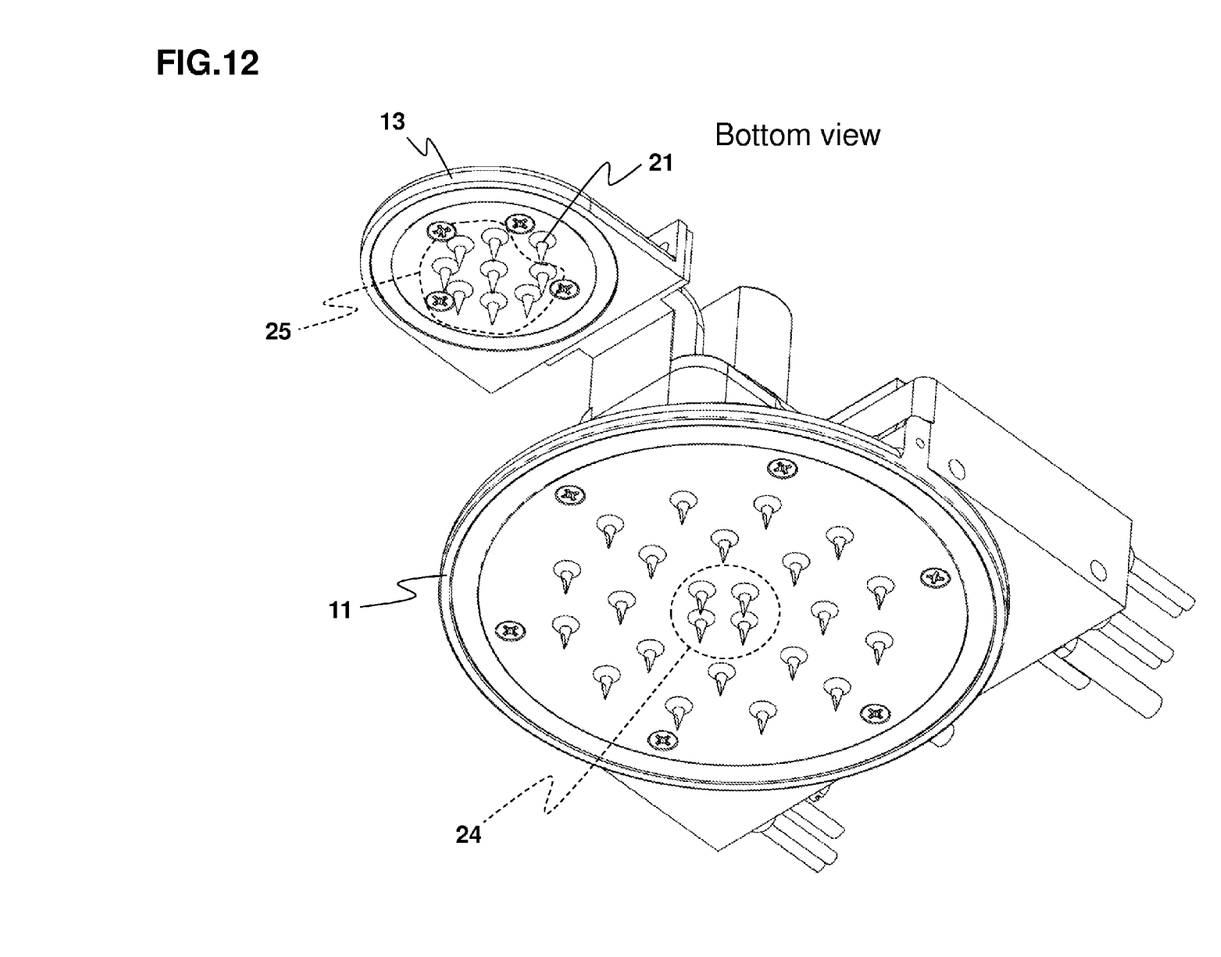
FIG. 12 is a perspective view of the steam shower plates for the cooking apparatus.

FIG. 12 is a perspective view of the steam shower plate lids in another embodiment of the cooking apparatus. The plate lids 11 and 13 are coupled together such that when the food plate lid 11 closes and its associated plurality of nozzles for delivery and return of steam penetrate through the foil of the food container, the flavor pod lid 13 also closes and its associated plurality of nozzles penetrate through the foil of the flavor container. In this embodiment, there are four return nozzles 24 centrally located on the food plate lid 11 to act as an exhaust port for drawing spent steam from the food container. For the flavor pod container, the delivery nozzle 21 is at the periphery and offset from the center (so the delivery nozzle for the flavor pod container is not centrally located on the flavor pod lid 13), and the remaining nozzles 25 operate as return nozzles through which flavored steam is conveyed back to the food lid 11 for the food container. The delivery and return nozzles may have different configurations. For example, the size, shape and openings (size, shape and number) for the delivery and return nozzles may differ from one another.

Although embodiments of the invention are described, it is understood that those skilled in the art may conceive modifications and/or variations to the specific embodiments shown and described herein. Any such modifications or variations that fall within the purview of this description are intended to be included therein as well. Unless specifically noted, the words and phrases in the specification and claims are intended to be given the ordinary and accustomed meanings to those of ordinary skill in the applicable art(s). It is, therefore, evident that the particular embodiments disclosed above may be altered or modified and all such variations are considered within the scope and spirit of the invention.

The invention claimed is:

1. A steam cooking apparatus comprising:
    a holder chamber;
    a food container having a bottom and a top, wherein the top is covered by a foil to enclose food to be steam cooked within the food container, the food container sized to fit within the holder chamber;
    a lid configured to engage the top of the food container within the holder chamber;
    a plurality of first nozzles extending from the lid into the holder chamber wherein when the lid engages the food container in the holder chamber, the plurality of first nozzles penetrate through the foil of the food container;
    a steam source;
    the plurality of first nozzles being in fluid communication with the steam source such that steam is introduced into the food container through the plurality of first nozzles; and
    a centrally located exhaust port extending from the lid and surrounded by the plurality of first nozzles, wherein when the lid is closed, the exhaust port extends through the foil of the food container, such that the steam introduced into the food container through the plurality of first nozzles exits the food container through the centrally located exhaust port.

2. The steam cooking apparatus of claim 1, further comprising:
    an exhaust fan to pull steam from the food container through the centrally located exhaust port, wherein the steam is reheated and recirculated back to the plurality of first nozzles.

3. The steam cooking apparatus of claim 2 further comprising:
    a second holder chamber;
    a second container covered by a second foil to enclose flavoring within the second container, the second container sized to fit within the second holder chamber;
    a second lid configured to engage the top of the second container within the second holder chamber;
    a plurality of second nozzles extending from the second lid into the second holder chamber wherein when the second lid is closed, the plurality of second nozzles penetrate through the second foil of the second container; and
    wherein at least one of the plurality of second nozzles being in fluid communication with the reheated steam such that reheated steam is introduced into the second container through the at least one second nozzle, and the reheated steam exits the second container through the remaining second nozzles, wherein the remaining second nozzles are in fluid communication with the plurality of first nozzles.

4. The steam cooking apparatus of claim 3, wherein the at least one second nozzle is not centrally located on the second lid.

5. The steam cooking apparatus of claim 4, wherein the first lid and the second lid are coupled together such that when the first lid opens, the second lid opens, and when the first lid closes and the plurality of first nozzles penetrate through the foil of the food container, the second lid closes and the plurality of second nozzles penetrate through the second foil of the second container.

6. The steam cooking apparatus of claim 1, wherein the steam introduced into the food container through the plurality of first nozzles is superheated.

7. The steam cooking apparatus of claim 1, wherein the food container has a bottom and further comprising an RFID tag in the bottom of the food container wherein the RFID tag contains information regarding the food in the food container.

8. The steam cooking apparatus of claim 1, wherein the steam introduced by the plurality of first nozzles has an absolute vapor pressure from 1 to 3 bars.

9. The steam cooking apparatus of claim 1, wherein the steam source is surrounded by a vacuum for thermal insulation.

10. The steam cooking apparatus of claim 1, further comprising a display to allow a user to order additional containers of food for steam cooking over an Internet connection.

11. The steam cooking apparatus of claim 1, wherein the food container further includes:
a perforated floor within the food container, wherein the perforated floor separates an upper portion of the food container from a lower portion of the food container, and the food occupies the upper portion of the food container adjacent the foil; wherein the foil is constructed of aluminum.

12. The steam cooking apparatus of claim 11, further comprising an RFID tag in the bottom of the food container wherein the RFID tag contains cooking information regarding the food in the food container; and a moisture-absorbing material in the lower portion of the food container below the perforated floor.

13. The steam cooking apparatus of claim 3, further comprising:
a perforated floor within the food container, wherein the perforated floor separates an upper portion of the food container from a lower portion of the food container, and the food occupies the upper portion of the food container adjacent the foil; wherein the foil is constructed of aluminum.

14. The apparatus of claim 13, further comprising an RFID tag in the bottom of the food container wherein the RFID tag contains cooking information regarding the food in the food container; and a moisture-absorbing material in the lower portion of the food container below the perforated floor.

15. A steam cooking apparatus comprising:
a holder chamber;
a food container having a bottom and a top, wherein the top is covered by a foil to enclose food to be steam cooked within the food container, the food container sized to fit within the holder chamber;
a lid configured to engage the top of the food container within the holder chamber;
a plurality of first nozzles extending from the lid into the holder chamber wherein when the lid engages the food container in the holder chamber, the plurality of first nozzles penetrate through the foil of the food container;
a steam source;
the plurality of first nozzles being in fluid communication with the steam source such that steam is introduced into the food container through the plurality of first nozzles;
an exhaust port extending from the lid, wherein when the lid is closed, the exhaust port extends through the foil of the food container, such that the steam introduced into the food container through the plurality of first nozzles exits the food container through the exhaust port;
a second holder chamber;
a second container covered by a second foil to enclose flavoring within the second container, the second container sized to fit within the second holder chamber;
a second lid configured to engage the top of the second container within the second holder chamber;
a plurality of second nozzles extending from the second lid into the second holder chamber wherein when the second lid is closed, the plurality of second nozzles penetrate through the second foil of the second container; and
wherein at least one of the plurality of second nozzles being in fluid communication with the exhaust port such that steam which exits the food container through the exhaust port is introduced into the second container through the at least one second nozzle, and the steam exits the second container through at least one of the remaining second nozzles, wherein the at least one remaining second nozzle is in fluid communication with the plurality of first nozzles such that the steam which exits the second container is recirculated back into the first container.

16. The steam cooking apparatus of claim 15, wherein the at least one second nozzle is not centrally located on the second lid.

17. The steam cooking apparatus of claim 15, wherein the first lid and the second lid are coupled together such that when the first lid opens, the second lid opens, and when the first lid closes and the plurality of first nozzles penetrate through the foil of the food container, the second lid closes and the plurality of second nozzles penetrate through the second foil of the second container.

18. The steam cooking apparatus of claim 15, further comprising:
an exhaust fan to pull steam from the food container through the exhaust port, wherein the steam is reheated before being introduced into the second container.

19. The steam cooking apparatus of claim 15, wherein the food container has a bottom and further comprising an RFID tag in the bottom of the food container wherein the RFID tag contains information regarding the food in the food container.

20. The steam cooking apparatus of claim 15, wherein the food container further includes:
a perforated floor within the food container, wherein the perforated floor separates an upper portion of the food container from a lower portion of the food container, and the food occupies the upper portion of the food container adjacent the foil; and a moisture-absorbing material is disposed in the lower portion of the food container below the perforated floor.

* * * * *